(12) United States Patent
Venkatakrishnan et al.

(10) Patent No.: US 12,417,466 B2
(45) Date of Patent: Sep. 16, 2025

(54) AGGREGATED ENERGY MANAGEMENT SYSTEM—INFRASTRUCTURE

(71) Applicant: Volvo Car Corporation, Gothenburg (SE)

(72) Inventors: Sriram Venkatakrishnan, Stockholm (SE); Daniel Elfstrand, Kungsbacka (SE); Arsam Golriz, Gothenburg (SE); Linus von Sydow, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/743,857

(22) Filed: Jun. 14, 2024

(65) Prior Publication Data

US 2024/0428280 A1 Dec. 26, 2024

Related U.S. Application Data

(60) Provisional application No. 63/509,676, filed on Jun. 22, 2023.

(51) Int. Cl.
*G06Q 30/0201* (2023.01)
*G06Q 50/06* (2024.01)

(52) U.S. Cl.
CPC ......... *G06Q 30/0206* (2013.01); *G06Q 50/06* (2013.01)

(58) Field of Classification Search
CPC ............................ G06Q 30/0206; G06Q 50/06
See application file for complete search history.

(56) References Cited

U.S. PATENT DOCUMENTS 10,033,220 B1 * 7/2018 Nguyen ................ H02J 9/06
10,108,957 B2 * 10/2018 Reid .................. G06Q 20/4016
(Continued)

FOREIGN PATENT DOCUMENTS

CN 117922335 A * 4/2024 ............ B60L 53/66
WO WO-2023032563 A1 * 3/2023 ............ G06F 9/505
(Continued)

OTHER PUBLICATIONS

Is Indrani Kar, "A real time smart charging station for EVs designed for V2G scenario and its coordination with renewable energy sources", published by IEEE Xplore in 2016, all pages (Year: 2016).*
(Continued)

*Primary Examiner* — Omar Zeroual
(74) *Attorney, Agent, or Firm* — Amin, Turocy & Watson, LLP

(57) ABSTRACT

Aggregated energy management (e.g., using a computerized tool) is enabled. For example, a system can comprise a memory that stores computer executable components, and a processor that executes the computer executable components stored in the memory, wherein the computer executable components comprise an energy component that determines an energy resource available to a bidirectional charging station electrically coupled to a vehicle, and based on current energy market demand, a unit price applicable to the energy resource, and a charging component that, based upon a defined charging criterion being determined to be satisfied, initiates a transfer of the energy resource between the vehicle and the bidirectional charging station according to the unit price.

20 Claims, 9 Drawing Sheets

(56) References Cited

U.S. PATENT DOCUMENTS

| | | | | |
|---|---|---|---|---|
| 10,404,076 | B2* | 9/2019 | Gersch | H02J 3/32 |
| 10,442,302 | B2* | 10/2019 | Kintner-Meyer | B60L 58/24 |
| 10,953,767 | B2* | 3/2021 | Loghavi | G06Q 10/06315 |
| 11,007,891 | B1* | 5/2021 | Kamal | H02J 13/00002 |
| 11,070,646 | B1* | 7/2021 | Lingafelt | H04L 67/51 |
| 11,605,964 | B1* | 3/2023 | Palombini | H02J 7/00032 |
| 2003/0191711 | A1* | 10/2003 | Jamison | G06Q 20/14 705/40 |
| 2004/0207366 | A1* | 10/2004 | Sung | H02J 7/35 320/140 |
| 2008/0039979 | A1* | 2/2008 | Bridges | B60L 55/00 700/286 |
| 2010/0094476 | A1* | 4/2010 | Hamilton, II | H02J 13/00002 702/62 |
| 2011/0130885 | A1* | 6/2011 | Bowen | B60L 53/65 700/291 |
| 2011/0156651 | A1* | 6/2011 | Christensen | B60L 53/305 320/128 |
| 2011/0191220 | A1* | 8/2011 | Kidston | B60L 3/04 705/412 |
| 2011/0282513 | A1* | 11/2011 | Son | B60L 53/64 700/297 |
| 2012/0095841 | A1* | 4/2012 | Luckerman | G06Q 50/06 705/14.66 |
| 2013/0198023 | A1* | 8/2013 | El Khayat | G06Q 30/0627 705/26.1 |
| 2014/0091747 | A1* | 4/2014 | Uyeki | B60L 53/64 320/101 |
| 2015/0378381 | A1* | 12/2015 | Tinnakornsrisuphap | F24F 11/47 700/295 |
| 2016/0261425 | A1* | 9/2016 | Horton | H04L 12/2803 |
| 2016/0321771 | A1* | 11/2016 | Liu | G06Q 30/0283 |
| 2017/0259683 | A1* | 9/2017 | Shimizu | B60L 53/63 |
| 2018/0123391 | A1* | 5/2018 | Lakamp | H02J 13/00028 |
| 2018/0290546 | A1* | 10/2018 | McGrath | B60L 53/665 |
| 2018/0345807 | A1* | 12/2018 | Cun | H02J 7/0049 |
| 2019/0146425 | A1* | 5/2019 | Lee | G06Q 30/0283 700/291 |
| 2020/0160461 | A1 | 5/2020 | Kaniki | |
| 2021/0074094 | A1* | 3/2021 | Schumacher | B60L 53/14 |
| 2021/0125253 | A1* | 4/2021 | Vega | H04L 67/12 |
| 2021/0295455 | A1* | 9/2021 | Aoshima | G01R 22/063 |
| 2021/0300201 | A1* | 9/2021 | Misawa | G06Q 20/145 |
| 2021/0305812 | A1* | 9/2021 | Ogawa | H02J 3/322 |
| 2022/0072973 | A1* | 3/2022 | Tsuchiya | B60L 53/14 |
| 2022/0285937 | A1* | 9/2022 | Lu | G05B 19/042 |
| 2022/0302701 | A1* | 9/2022 | Sun | G06Q 30/0284 |
| 2022/0388420 | A1* | 12/2022 | Takayama | B60L 53/66 |
| 2022/0414798 | A1* | 12/2022 | Penfold | B60L 53/66 |
| 2023/0268736 | A1* | 8/2023 | Saito | H02J 3/008 323/318 |
| 2023/0356617 | A1* | 11/2023 | Belur | G06Q 50/06 |
| 2023/0406144 | A1* | 12/2023 | Dow | B60L 53/14 |
| 2023/0406147 | A1* | 12/2023 | Harirchi | B60L 53/63 |
| 2024/0140239 | A1* | 5/2024 | Anand | B60L 53/305 |
| 2024/0250321 | A1* | 7/2024 | Mitsuyama | H01M 10/482 |
| 2024/0266842 | A1* | 8/2024 | Munson | H01M 50/143 |

FOREIGN PATENT DOCUMENTS

| | | | | |
|---|---|---|---|---|
| WO | WO-2023212543 | A1 * | 11/2023 | G06F 1/26 |
| WO | WO-2023250213 | A1 * | 12/2023 | |
| WO | WO-2024162985 | A1 * | 8/2024 | G06Q 30/01 |

OTHER PUBLICATIONS

Victor Udo, "A test of Vehicle to Grid (V2G) for energy storage and frequency regulation in the PJM system", published by University of Delaware in 2008, all pages (Year: 2008).*

Yimin Zhou, "Vehicle to Grid Technology: A review", published by IEEE Xplore in 2015, all pages (Year: 2015).*

International Search Report and Written Opinion received for PCT Application Serial No. PCT/EP2024/067505 dated Sep. 30, 2024, 14 pages.

International Search Report and Written Opinion received for PCT Application Serial No. PCT/EP2024/067504 dated Sep. 27, 2024, 14 pages.

* cited by examiner

AGGREGATED ENERGY MANAGEMENT SYSTEM—INFRASTRUCTURE

CROSS REFERENCE TO RELATED APPLICATION

This application claims the benefit of U.S. Provisional Patent Application No. 63/509,676 filed Jun. 22, 2023, and entitled "AGGREGATED ENERGY MANAGEMENT SYSTEM-INFRASTRUCTURE," which is incorporated by reference herein in its entirety.

TECHNICAL FIELD

The disclosed subject matter relates to vehicles (e.g., transportation vehicles) and, more particularly, to aggregated battery management for vehicles and charging stations.

BACKGROUND

Charging an electric vehicle using renewable (e.g., "green") sources of electricity (e.g., wind, solar, and, to an extent, nuclear power—because nuclear reduces the CO2 footprint) can be desirable for environmental reasons, among others. However, when more and more electric vehicles use renewable sources, congestion of a corresponding electrical grid can increase and thus volatility of the electrical grid can also increase. Further, solar and wind resources, among others, can yield intermittent, and sometimes unpredictable, energy supplies.

The above-described background relating to vehicle charging is merely intended to provide a contextual overview of some current issues and is not intended to be exhaustive. Other contextual information may become further apparent upon review of the following detailed description.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, apparatuses and/or computer program products that facilitate aggregated energy management are described.

As alluded to above, energy management can be improved in various ways, and various embodiments are described herein to this end and/or other ends.

According to an embodiment, a system can comprise a memory that stores computer executable components, and a processor that executes the computer executable components stored in the memory, wherein the computer executable components can comprise an energy component that determines an energy resource available to a bidirectional charging station electrically coupled to a vehicle, and based on current energy market demand, a unit price applicable to the energy resource, and a charging component that, based upon a defined charging criterion being determined to be satisfied, initiates a transfer of the energy resource between the vehicle and the bidirectional charging station according to the unit price.

According to another embodiment, a non-transitory machine-readable medium can comprise executable instructions that, when executed by a processor, facilitate performance of operations, comprising determining an energy resource available to a bidirectional vehicle charger electrically coupled to a vehicle, based on current energy market demand, determining a unit price applicable to the energy resource, and based upon a defined charging criterion being determined to be satisfied, initiating a transfer of the energy resource between the vehicle and the bidirectional vehicle charger according to the unit price.

According to yet another embodiment, a method can comprise determining, by an energy management system comprising a processor, an energy resource available to a bidirectional charging device electrically coupled to a vehicle, based on current energy market demand, determining, by the energy management system, a unit price applicable to the energy resource, and based upon a defined charging criterion being determined to be satisfied, initiating, by the energy management system, a transfer of the energy resource between the vehicle and the bidirectional charging device according to the unit price.

DETAILED DESCRIPTION

Figure 1:
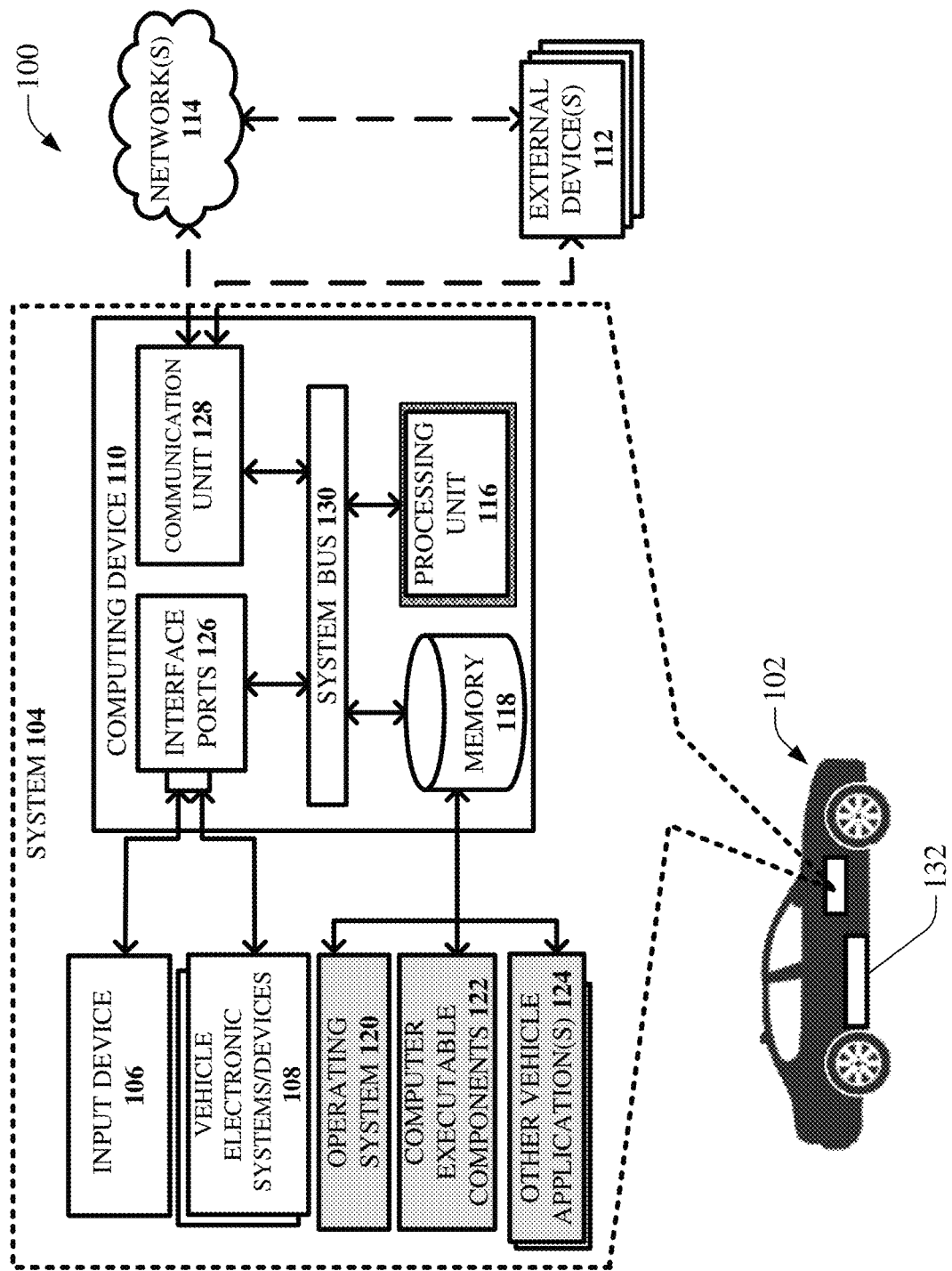
FIG. 1 illustrates a block diagram of an exemplary system in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, conductive coupling, acoustic coupling, ultrasound coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

The computer processing systems, computer-implemented methods, apparatus and/or computer program products described herein employ hardware and/or software to solve problems that are highly technical in nature (e.g., determining and/or executing one or more actions determined to aggregated energy resources herein), that are not abstract and cannot be performed as a set of mental acts by a human.

One or more embodiments can comprise an energy management system. The energy management system can be comprised in a vehicle described herein, in an electric charging station or charger, on a mobile device, on a server, or in/on another suitable device. In various embodiments, the energy management system can pool available energy resources (e.g., resources within a defined area and/or registered with the energy management system). In this regard, the energy management system can comprise aggregation system in which vehicles and/or chargers are enabled to join the energy management system, for instance, to share available charge or energy (e.g., electricity). In an example, the energy management system can comprise a neighborhood or network of electric vehicle chargers and battery electric vehicles.

In an embodiment, a vehicle registered with the energy management system described herein can join an aggregation pool and/or provide energy for aggregation by the energy management system. In various embodiments, vehicles, chargers, mobile devices, or other devices can register with the energy management system (e.g., opt-in to use with the energy management system). For example, a vehicle can opt-in to use the energy management system. Thereafter, every time the vehicle is plugged into a charger or charging station (e.g., at home or a designated charger or charging station) that is registered with the energy management system, the vehicle can provide or offer access to the vehicle's available charge, if any, depending on defined vehicle settings and/or user input. In this regard, a vehicle herein can share a portion of its charge with other vehicles via the energy management system. It is noted that the charge of a vehicle herein can be ranked according to a defined green energy rating algorithm (later discussed in greater detail), which can be based on the type of energy used to provide a current state of charge of the vehicle's battery.

In various embodiments, the energy management system can be triggered to initiate a charge or discharge by one or more of a variety of triggers. In an embodiment, when collective energy usage crosses a defined threshold, the energy management system can be configured to activate an aggregation protocol, for instance, to collect energy from all (or a set of) the collected vehicle(s)/charger(s) that are registered with the energy management system. Additionally, or alternatively, the energy management system can comprise a bidding mechanism, which can enable biding (e.g., by vehicles, chargers, users, or other entities registered with the energy management system) on the registered energy resources to utilize the energy resources effectively/efficiently (e.g., to maximize profits for the resources and/or reduce waste).

In various embodiments, the energy management system can communicate with all connected devices, for instance, to provide instructions regarding charging and/or discharging. In one or more embodiments, the energy management system can determine parameter(s) for each vehicle, charger, device, etc. registered with the energy management system (e.g., which vehicle needs to stop charging, reduce charging percentage, increase charging percentage, thresholds, etc.). The energy management system can comprise a signaling/communication module (e.g., a communication component) which can send information (e.g., according to a defined communication protocol between chargers, charging stations, energy management systems, vehicles, mobile devices, servers, etc.) to a registered control module that controls charging by each charger registered with the energy management system.

In various embodiments, a vehicle herein can (e.g., after registration with an energy management system herein) participate in the bidding process, for instance, prior to extracting energy via the energy management system. In this regard, the bidding system can enable bidding on energy resources to purchase and/or bidding on resources to sell (e.g., from vehicles herein or other energy resources herein). In an example, once a vehicle is connected to the energy management system, the vehicle can be enabled, based on current energy market, to bid on resources to obtain the best unit price and/or total price. The foregoing can thus reduce charging costs for users registered with the energy management system. In this regard, the vehicle can bid on resources via the energy management system, for instance, prior to obtaining energy via a different method (e.g., on a different market).

Turning now to FIG. 1, there is illustrated an example, non-limiting system 100 in accordance with one or more embodiments herein. System 100 can comprise a computerized tool, which can be configured to perform various operations relating to aggregated energy management. In accordance with various exemplary embodiments, system 100 can be deployed on or within a vehicle 102, (e.g., an automobile, as shown in FIG. 1). Although FIG. 1 depicts the vehicle 102 as an automobile, the architecture of the system 100 is not so limited. For instance, the system 100 described herein can be implemented with a variety of types of vehicles 102. Example vehicles 102 that can incorporate the exemplary system 100 can include, but are not limited to: automobiles (e.g., autonomous vehicles), airplanes, trains, motorcycles, carts, trucks, semi-trucks, buses, boats, recreational vehicles, helicopters, jets, electric scooters, electric bicycles, a combination thereof, and/or the like. It is additionally noted that the system 100 can be implemented in a variety of types of automobiles, such as battery electric vehicles, hybrid vehicles, plug-in hybrid vehicles, or other suitable types of vehicles. In further embodiments, the system 100 can be implemented in a charging station 404 (see FIG. 4), mobile device 304 or 306 (see FIGS. 3 and 4), a server, or otherwise implemented in accordance with the various embodiments herein. In this regard, the system 100 is not limited to implementation in vehicles, and in various embodiments herein, is implemented in vehicle chargers, vehicle charging devices, and/or vehicle charging stations (e.g., bidirectional chargers, charging devices, and/or charging stations).

Figure 3:
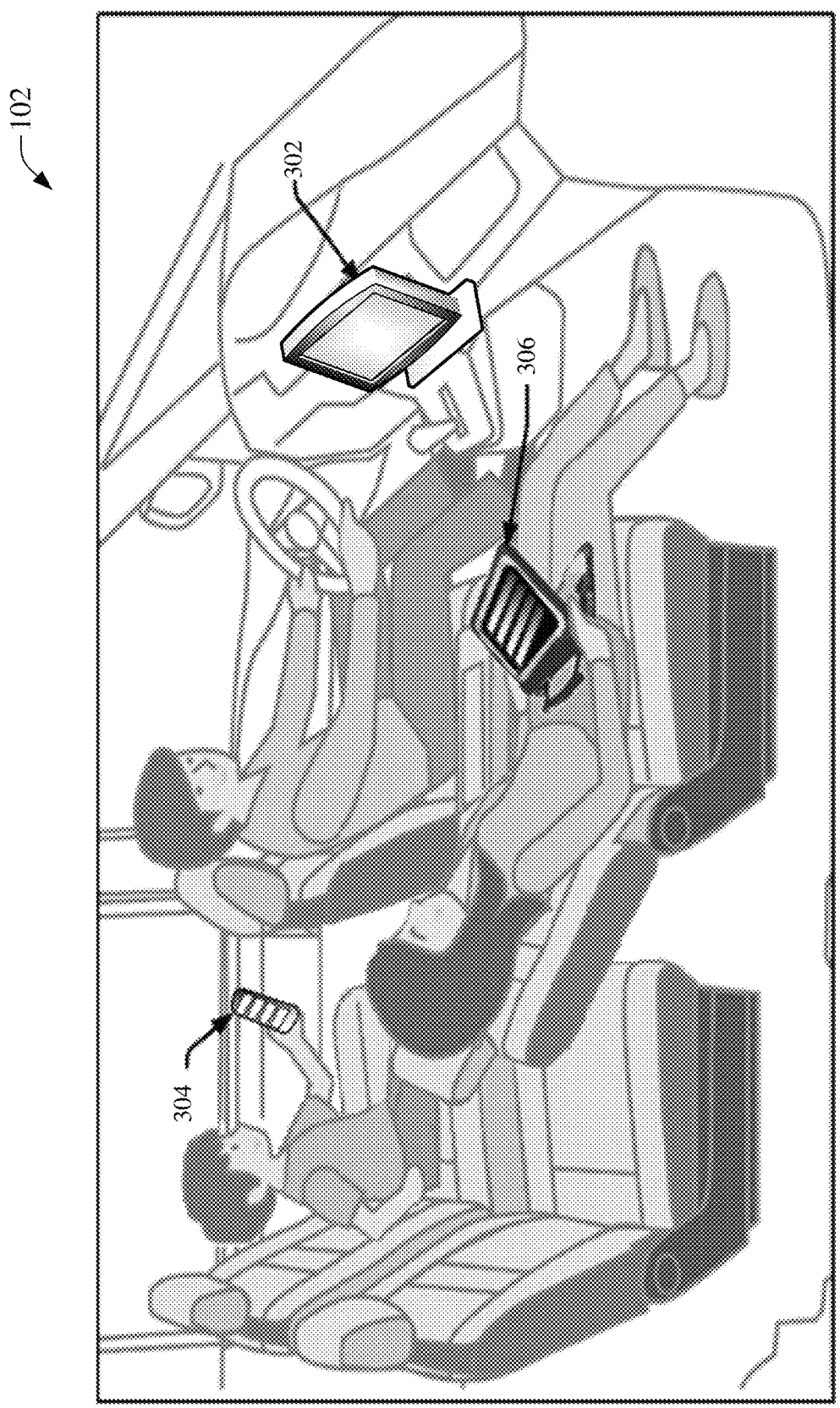
FIG. 3 illustrates a diagram of an example, non-limiting vehicle interior in accordance with one or more embodiments described herein.
Figure 4:
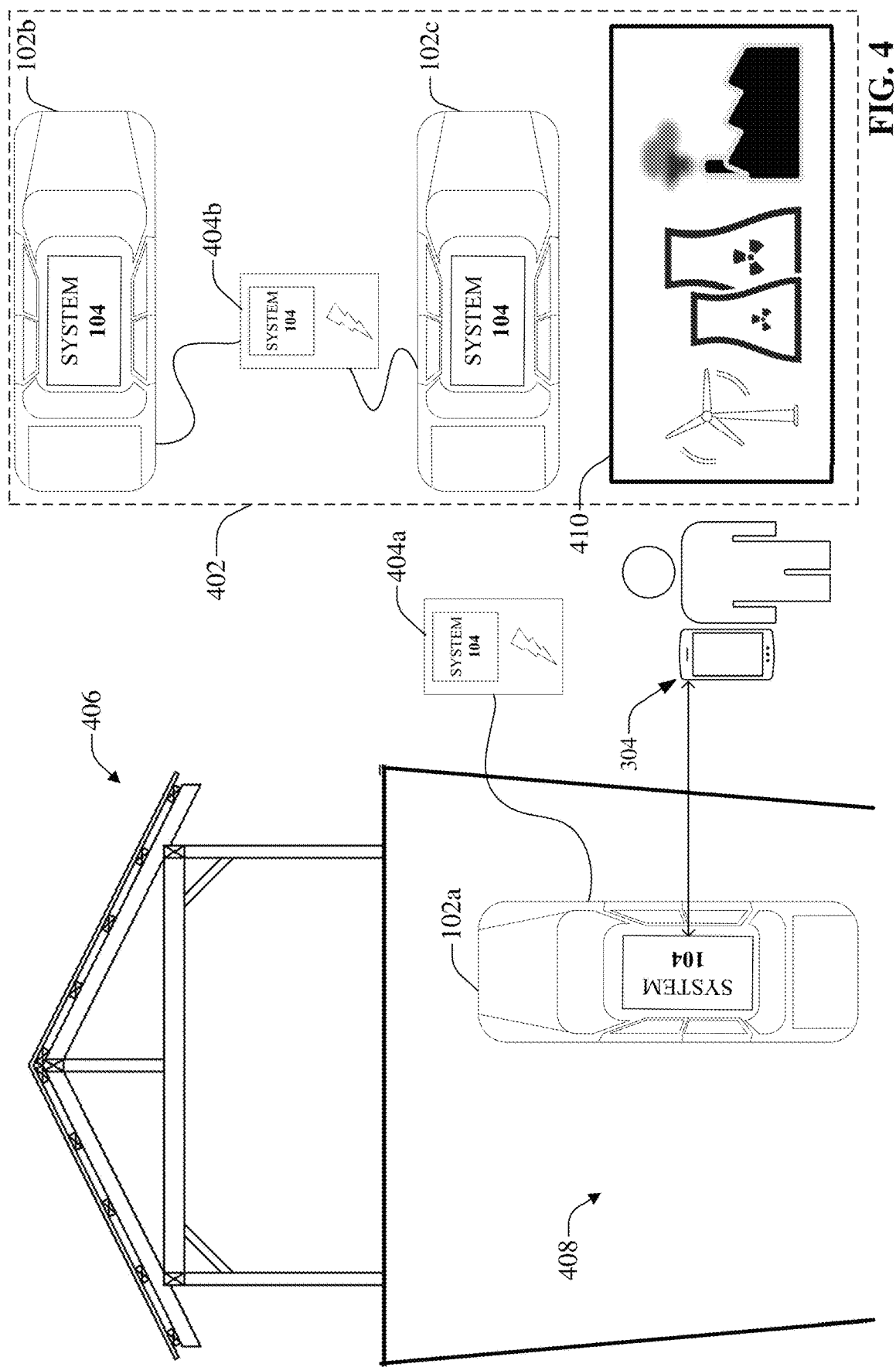
FIG. 4 illustrates a diagram of example, non-limiting scenarios in accordance with one or more embodiments described herein.

As shown in FIG. 1, the system 100 can comprise one or more energy management systems 104, which can include one or more input devices 106, one or more other vehicle electronic systems and/or devices 108, and/or one or more computing devices 110. Additionally, the system 100 can comprise one or more external devices 112 that can be communicatively and/or operatively coupled to the one or more computing devices 110 of the one or more energy management systems 104 either via a one or more networks 114 and/or a direct electrical connection (e.g., as shown in FIG. 1). In various embodiments, one or more of the energy management system 104, input devices 106, vehicle electronic systems and/or devices 108, computing devices 110, external devices 112, and/or networks 114 can be communicatively or operably coupled (e.g., over a bus or wireless network) to one another to perform one or more functions of the system 100. It is noted that, while energy management system 104 is depicted as a component of vehicle 102, it is not limited to being a component of a vehicle. In various embodiments, a charging station 404 (as depicted in FIG. 4) can comprise the energy management system 104, a mobile device 304 (as depicted in FIG. 3) or mobile device 306 can comprise the energy management system 104, a server can comprise the energy management system 104, or another suitable device, component, and/or entity can comprise the energy management system 104.

The one or more input devices 106 can display one or more interactive graphic entity interfaces ("GUIs") that facilitate accessing and/or controlling various functions and/or application of the vehicle 102. The one or more input devices 106 can display one or more interactive GUIs that facilitate accessing and/or controlling various functions and/or applications. The one or more input devices 106 can comprise one or more computerized devices, which can include, but are not limited to: personal computers, desktop computers, laptop computers, cellular telephones (e.g., smartphones or mobile devices), computerized tablets (e.g., comprising a processor), smart watches, keyboards, touchscreens, mice, a combination thereof, and/or the like. An entity or user of the system 100 can utilize the one or more input devices 106 to input data into the system 100. Additionally, the one or more input devices 106 can comprise one or more displays that can present one or more outputs generated by the system 100 to an entity. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

For example, the one or more input devices 106 can comprise a touchscreen that can present one or more graphical touch controls that can respectively correspond to a control for a function of the vehicle 102, an application, a function of the application, interactive data, a hyperlink to data, and the like, wherein selection and/or interaction with the graphical touch control via touch activates the corresponding functionality. For instance, one or more GUIs displayed on the one or more input devices 106 can include selectable graphical elements, such as buttons or bars corresponding to a vehicle navigation application, a media application, a phone application, a back-up camera function, a car settings function, a parking assist function, and/or the like. In some implementations, selection of a button or bar corresponding to an application or function can result in the generation of a new window or GUI comprising additional selectable icons or widgets associated with the selected application. For example, selection of one or more selectable options herein can result in generation of a new GUI or window that includes additional buttons or widgets with one or more selectable options. The type and appearance of the controls can vary. For example, the graphical touch controls can include icons, symbols, widgets, windows, tabs, text, images, a combination thereof, and/or the like.

The one or more input devices 106 can comprise suitable hardware that registers input events in response to touch (e.g., by a finger, stylus, gloved hand, pen, etc.). In some implementations, the one or more input devices 106 can detect the position of an object (e.g., by a finger, stylus, gloved hand, pen, etc.) over the one or more input devices 106 within close proximity (e.g., a few centimeters) to touchscreen without the object touching the screen. As used herein, unless otherwise specified, reference to "on the touchscreen" refers to contact between an object (e.g., an entity's finger) and the one or more input devices 106 while reference to "over the touchscreen" refers to positioning of an object within close proximity to the touchscreen (e.g., a defined distance away from the touchscreen) yet not contacting the touchscreen.

The type of the input devices 106 can vary and can include, but is not limited to: a resistive touchscreen, a surface capacitive touchscreen, a projected capacitive touchscreen, a surface acoustic wave touchscreen, and an infrared touchscreen. In various embodiments, the one or more input devices 106 can be positioned on the dashboard of the vehicle 102, such as on or within the center stack or center console of the dashboard. However, the position of the one or more input devices 106 within the vehicle 102 can vary.

The one or more other vehicle electronic systems and/or devices 108 can include one or more additional devices and/or systems (e.g., in addition to the one or more input devices 106 and/or computing devices 110) of the vehicle 102 that can be controlled based at least in part on commands issued by the one or more computing devices 110 (e.g., via one or more processing units 116) and/or commands issued by the one or more external devices 112 communicatively coupled thereto. For example, the one or more other vehicle electronic systems and/or devices 108 can comprise: a media system (e.g., audio and/or video); a back-up camera system; a heating, ventilation, and air conditioning ("HVAC") system; a lighting system; a cruise control system, a power locking system, a navigation system, an autonomous driving system, a vehicle sensor system, telecommunications system, a combination thereof, and/or the like. Other example other vehicle electronic systems and/or devices 108 can comprise one or more sensors, which can comprise odometers, altimeters, speedometers, accelerometers, engine features and/or components, fuel meters, flow meters, cameras (e.g., digital cameras, heat cameras, infrared cameras, and/or the like), lasers, radar systems, lidar systems, microphones, vibration meters, moisture sensors, thermometers, seatbelt sensors, wheel speed sensors, a combination thereof, and/or the like. For instance, a speedometer of the vehicle 102 can detect the vehicle's 102 traveling speed. Further, the one or more sensors can detect and/or measure one or more conditions outside the vehicle 102, such as: whether the vehicle 102 is traveling through a rainy environment; whether the vehicle 102 is traveling through winter conditions (e.g., snowy and/or icy conditions); whether the vehicle 102 is traveling through very hot conditions (e.g., desert conditions); and/or the like. Example navigational information can include, but is not limited to: the destination of the vehicle 102, the position of the vehicle 102, the type of vehicle 102, the speed of the vehicle 102, environmental conditions surrounding the vehicle 102, the planned route of the vehicle 102, traffic conditions expected to be encountered by the vehicle 102, operational status of the vehicle 102, a combination thereof, and/or the like.

The one or more computing devices 110 can facilitate executing and controlling one or more operations of the vehicle 102, including one or more operations of the one or more input devices 106, and the one or more other vehicle electronic systems/devices 108 using machine-executable instructions. In this regard, embodiments of system 100 and other systems described herein can include one or more machine-executable components embodied within one or more machines (e.g., embodied in one or more computer readable storage media associated with one or more machines, such as computing device 110). Such components, when executed by the one or more machines (e.g., processors, computers, virtual machines, etc.) can cause the one or more machines to perform the operations described.

For example, the one or more computing devices 110 can include or be operatively coupled to at least one memory 118 and/or at least one processing unit 116. The one or more processing units 116 can be any of various available processors. For example, dual microprocessors and other multiprocessor architectures also can be employed as the processing unit 116. In various embodiments, the at least one memory 118 can store software instructions embodied as functions and/or applications that when executed by the at least one processing unit 116, facilitate performance of operations defined by the software instruction. In the embodiment shown, these software instructions can include one or more operating system 120, one or more computer-executable components 122, and/or one or more other vehicle applications 124. For example, the one or more operating systems 120 can act to control and/or allocate resources of the one or more computing devices 110. It is to be appreciated that the claimed subject matter can be implemented with various operating systems or combinations of operating systems.

The one or more computer executable components 122 and/or the one or more other vehicle applications 124 can take advantage of the management of resources by the one or more operating systems 120 through program modules and program data also stored in the one or more memories 118. The one or more computer executable components 122 can provide various features and/or functionalities that can facilitate aggregated energy management herein. Example, other vehicle applications 124 can include, but are not limited to: a navigation application, a media player application, a phone application, a vehicle settings application, a parking assistance application, an emergency roadside assistance application, a combination thereof, and/or the like. The features and functionalities of the one or more computer executable components 122 are discussed in greater detail infra.

The one or more computing devices 110 can further include one or more interface ports 126, one or more communication units 128, and a system bus 130 that can communicatively couple the various features of the one or more computing devices 110 (e.g., the one or more interface ports 126, the one or more communication units 128, the one or more memories 118, and/or the one or more processing units 116). The one or more interface ports 126 can connect the one or more input devices 106 (and other potential devices) and the one or more other vehicle electronic systems/devices 108 to the one or more computing devices 110. For example, the one or more interface ports 126 can include, a serial port, a parallel port, a game port, a universal serial bus ("USB") and the like.

The one or more communication units 128 can include suitable hardware and/or software that can facilitate connecting one or more external devices 112 to the one or more computing devices 110 (e.g., via a wireless connection and/or a wired connection). For example, the one or more communication units 128 can be operatively coupled to the one or more external devices 112 via one or more networks 114. The one or more networks 114 can include wired and/or wireless networks, including but not limited to, a personal area network ("PAN"), a local area network ("LAN"), a cellular network, a wide area network ("WAN", e.g., the Internet), and the like. For example, the one or more external devices 112 can communicate with the one or more computing devices 110 (and vice versa) using virtually any desired wired or wireless technology, including but not limited to: wireless fidelity ("Wi-Fi"), global system for mobile communications ("GSM"), universal mobile telecommunications system ("UMTS"), worldwide interoperability for microwave access ("WiMAX"), enhanced general packet radio service (enhanced "GPRS"), fifth generation ("5G") communication system, sixth generation ("6G") communication system, third generation partnership project ("3GPP") long term evolution ("LTE"), third generation partnership project 2 ("3GPP2") ultra-mobile broadband ("UMB"), high speed packet access ("HSPA"), Zigbee and other 802.XX wireless technologies and/or legacy telecommunication technologies, near field communication ("NFC") technology, BLUETOOTH®, Session Initiation Protocol ("SIP"), ZIGBEE®, RF4CE protocol, WirelessHART protocol, 6LoWPAN (IPv6 over Low power Wireless Area Networks), Z-Wave, an ANT, an ultra-wideband ("UWB") standard protocol, and/or other proprietary and non-proprietary communication protocols. In this regard, the one or more communication units 128 can include software, hardware, or a combination of software and hardware that is configured to facilitate wired and/or wireless communication between the one or more computing devices 110 and the one or more external devices 112. While the one or more communication units 128 are shown for illustrative clarity as a separate unit that is not stored within memory 118, it is to be appreciated that one or more (software) components of the communication unit can be stored in memory 118 and include computer executable components.

The one or more external devices 112 can include any suitable computing device comprising a display and input device (e.g., a touchscreen) that can communicate with the one or more computing devices 110 comprised within the energy management system 104 and interface with the one or more computer executable components 122 (e.g., using a suitable application program interface ("API")). For example, the one or more external devices 112 can include, but are not limited to: a mobile phone, a smartphone, a tablet personal computer ("PC"), a digital assistant ("PDA"), a heads-up display ("HUD"), virtual reality ("VR") headset, an augmented reality ("AR") headset, or another type of wearable computing device, a desktop computer, a laptop computer, a computer tablet, a combination thereof, and the like.

Figure 2:
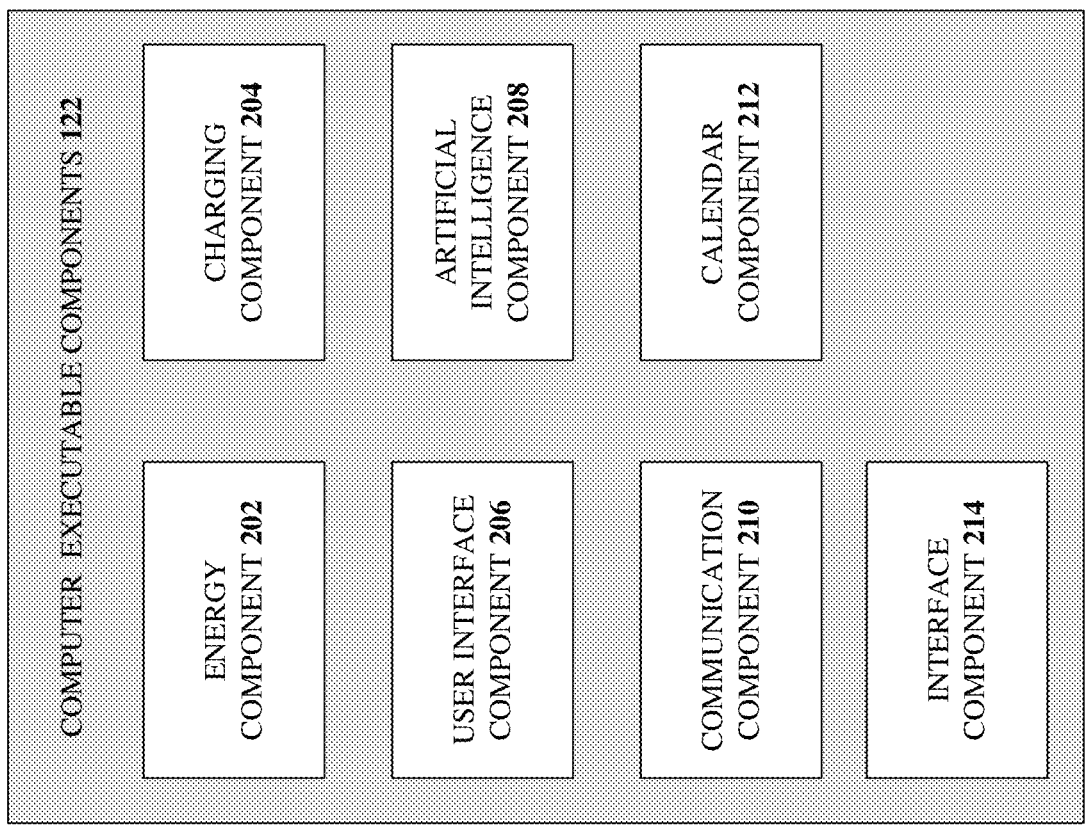
FIG. 2 illustrates a block diagram of example, non-limiting computer executable components in accordance with one or more embodiments described herein.

FIG. 2 illustrates a block diagram of example, non-limiting computer executable components 122 that can facilitate aggregated energy management in accordance with one or more embodiments described herein. Repetitive description of like elements employed in other embodiments described herein is omitted for sake of brevity. As shown in FIG. 2, the one or more computer executable components 122 can comprise energy component 202, charging component 204, user interface component 206, artificial intelligence (AI) component 208, communication component 210, calendar component 212, and/or interface component 214.

In various embodiments, the energy component 202 can determine an energy resource (e.g., of the energy resources 402) available to a charging station 404 electrically coupled to a vehicle 102. In this regard, the energy component 202 can determine which energy resource can be utilized for bidirectional energy transfer (e.g., between a vehicle 102 and a charging station 404). In one or more embodiments, the energy resource can be among a plurality of energy resources of a group of energy resources 402. In various embodiments, the energy resource can comprise one or more of a non-renewable energy resource, a renewable energy resource, energy stored in a battery 132 of the vehicle 102, energy stored in a battery of another vehicle, other than the vehicle 102, an aggregation of a plurality of energy resources, and/or another suitable energy resource.

In various embodiments, the energy component 202 can (e.g., based on current energy market demand) determine a unit price applicable to the energy resource. In this regard, the energy component 202 can leverage current energy prices to determine unit pricing for each energy resource available to the vehicle 102 via the energy management system 104. Such energy prices can fluctuate based on time of day, season, or other market conditions. In various embodiments, the energy component 202 can set the unit price as a defined function of a current energy price. In various embodiments, the unit price can be based on a market price of a common energy type (e.g., renewable, non-renewable, etc.). In some embodiments, the energy management system 104 can utilize blockchain technology to track energy resources, unit prices, and/or energy consumption herein.

In various embodiments, the charging component 204 can, based upon a defined charging criterion (later discussed in greater detail) being determined (e.g., via the charging component 204) to be satisfied, initiate a transfer of the energy resource between the vehicle 102 and the charging station 404 according to the above-described unit price. In some embodiments, the transfer can be from the charging station 404 to the vehicle 102. In further embodiments, the transfer can be from a battery 132 of the vehicle 102 to the energy management system 104 via the charging station 404. In this regard, the charging station 404 and the vehicle 102 can both support bidirectional energy transfer. The charging component 204 can cause the energy resource to be transferred via a wired connection between charging station 404 and the vehicle 102, or via a wireless electrical connection between the charging station 404 and the vehicle 102 (e.g., via electromagnetic induction).

In various embodiments, the energy component 202 can determine a green energy rating, applicable to the energy resource, according to a defined green energy rating process. In one or more embodiments, the defined green energy rating process can be based on a percentage of charge of a battery that was originally sourced from a defined green (e.g., renewable, nuclear, etc.) energy source. In one or more embodiments, the defined charging criterion can comprise a defined energy price preference threshold. In this regard, the unit price can be determined to be less than or equal to the defined energy price preference threshold. For example, the defined charging criterion can comprise charging via a green energy resource up to a defined threshold unit price for that green energy resource. In further embodiments, the defined charging criterion can comprise a defined green energy preference rating. In this regard, the green energy rating can be determined to be greater than or equal to the defined green energy preference rating. For example, the defined green energy preference can comprise charging from an energy resource of at least 72% green rating (e.g., at any unit price or up to a defined unit price limit).

When energy resources are aggregated, the energy component 202 can associate metadata with a given energy resource (e.g., a data tag). Such metadata can comprise, for instance, energy resource origination information, unit price information, green energy rating information, or other suitable information. In one or more embodiments, the data tag can comprise a resource ID. A charging station 404 can thus be enabled to identify a green rating based on the resource ID. For example, resource ID 1 can comprise green energy, and resource ID 2 can comprise non-green energy.

In various embodiments, the user interface component 206 can receive an input from a user entity associated with the charging station 404 and/or vehicle 102. In this regard, the defined charging criterion can comprise reception (e.g., via the user interface component 206) of the input from the user/user entity. It is noted that the user interface component 206 can control a user interface on one of more of a vehicle 102 infotainment system 302, mobile device 304, mobile device 306, charging station 404, or another suitable user interface. Via the user interface component 206, a user can provide a selection of user preferences regarding energy resources herein. For example, such a preference can comprise utilization of only green energy (e.g., according to a defined green energy rating) to charge the battery 132 of the vehicle 102. The energy component 202 can then determine how much green energy is available for charging, and associated costs. Via the user interface component 206, a user can set price limits (e.g., thresholds) for certain types of energy. For example, a user can set a price limit of $0.15 per kilowatt-hour for non-green energy, but a price limit of $0.20 per kilowatt-hour for green energy. When a charging station 404 aggregates energy for an entire neighborhood (e.g., a defined area or region), the energy component 202 can determine where an energy resource is coming from and associated energy resource costs. In further embodiments, user preferences can be predefined, and when the vehicle 102 is connected to the charging station 404, the energy management system 104 abides by such priorities/preferences. In an example, a preference herein can comprise utilization of threshold green energy at any cost. Another preference herein can comprise utilization of the cheapest energy available.

When a vehicle 102 is connected to the charging station 404, the user interface component 206 can generate and/or render energy resources choices on a display (e.g., infotainment system 302, mobile device 304 or mobile device 306, or another suitable display), providing a user with choices of all available resources and corresponding prices. The availability and pricing can vary, instance, according to time of day, or by day. For example, between 5:00 PM and 6:00 PM, an energy resource can cost $0.18 per kilowatt-hour, but after 6:00 PM, the same energy resource can comprise a reduced cost (e.g., due to lower demand).

Via the user interface component 206, once a vehicle 102 is connected to a charging station 404, the user interface component 206 can be utilized by a user to offer extra charge (e.g., discharge energy), from the vehicle 102, via the energy management system 104, at a price set by the user. In various embodiments, the energy component 202 can determine (e.g., using a defined price determination function) a suggested price based on current energy market conditions and/or prices. The energy management system 104 can track the type of energy resource utilized (e.g., green energy rating) to charge the battery 132 of the vehicle 102 prior to offering its electricity for sale via the energy management system 104. For example, when a vehicle 102 is connected to the energy management system 104, the battery 132 can have 90% of its charge remaining. Of that 90% charge, a percentage can comprise green energy and another percentage can comprise non-green energy. In this regard, energy discharged from the vehicle 102 can be tracked according to the green energy rating of the energy resource utilized to charge the battery 132 of the vehicle 102. A buyer of energy from the vehicle 102 can preference purchasing only green energy (e.g., a defined threshold level of green energy) from the vehicle 102, and the energy management system 104 can thus be configured to discharge only a percentage of the battery 132 charge corresponding to the green energy selected for resale. In various embodiments, a user of the vehicle 102 and/or energy management system 104 can set a price at which the user is willing to sell energy via the energy management system 104, and the price can be configured according to one or more of time of day, day, type of energy, relationship with user (e.g., friend/family discount), or other suitable factors.

In some embodiments, energy consumption herein can be layered. For example, a first layer of energy consumption can comprise utilization of the cleanest energy at the lowest cost. Once that resource has been exhausted, a second layer can comprise charging from other vehicles, rather than a charging station 404. In this regard, vehicles herein can sell back via the energy management system 104. When selling energy from a vehicle 102 herein, metadata associated with the type of energy resource utilized to originally provide the charge can be recorded and provided to downstream consumers of that energy/energy resource. Such metadata can comprise, for instance, energy resource origination information, unit price information, green energy rating information, or other suitable information.

As described herein, energy resources can comprise green energy ratings according to a defined green energy rating algorithm. For example, if a battery 132 of a vehicle 102 is charged with 72% green energy, then that can comprise its green energy rating or utilized to derive a green energy rating or score. Energy prices herein can vary, for instance, according to such green energy ratings. In various embodiments, the user interface component 206 can comprise a slider on an infotainment system 302 of the vehicle 102, thus enabling a user to set preferences corresponding to green energy ratings herein.

In various embodiments, the artificial intelligence component 208 can, using machine learning applied to past energy resources, past unit prices, and/or past green energy ratings, determine the defined charging criterion described herein. In one or more embodiments, the artificial intelligence component 208 can leverage principles of machine learning and/or artificial intelligence to determine an optimal way to provide resources to vehicle(s) 102 in the most efficient way (e.g., minimizing collective energy costs, minimizing $CO_2$ footprint, etc.)

In an example, at the time the vehicle 102 is connected to a charging station 404, only one type of energy resource may be available, however, at a later point in time, another type of energy can become available. The energy component 202 and/or charging component 204 can thus change the energy resource source automatically according to defined preferences (e.g., according to input by user via the user interface component 206, and/or via instruction from the artificial intelligence component 208). Further, the artificial intelligence component 208 can predict that at a particular time during an expected charging cycle of a vehicle 102, energy resource prices will drop, and the artificial intelligence component 208 can cause the charging component 204 to wait to charge via the charging station 404 until the energy resource prices drop, without disrupting a user's predicted use of the vehicle 102.

In another embodiment, the artificial intelligence component 208 can predict whether a user of a vehicle 102 would preference charging or discharging (e.g., selling energy) via the energy management system 104 depending on, for instance, an instant charge level of a battery 132 of the vehicle 102, expected driving applicable to the vehicle 102, and/or other suitable factors. For example, if a battery 132 of a vehicle 102 is at 20% state of charge, the artificial intelligence component 208 can predict that the vehicle 102 will seek to acquire a charge. However, if the battery 132 of the vehicle 102 is at 90% state of charge, and the artificial intelligence component 208 predicts that the vehicle 102 will not be driven for a defined period of time (e.g., depending on vehicle 102 history, calendar events, etc.), then the artificial intelligence component 208 can predict that the vehicle 102 can be utilized to discharge (e.g., sell energy) via the energy management system 104. Discharge limits (e.g., based on calendar events) and/or expected driving habits or distances can be utilized by the artificial intelligence component 208 to make such predictions. Once the artificial intelligence component 208 makes such a prediction, the communication component 210 and/or the interface component 214 can be utilized for communication between the vehicle 102 and the charging station 404 regarding charging/discharging. The artificial intelligence component 208 can then set a price at which energy from the vehicle 102 can be acquired via the energy management system 104. In various embodiments, the artificial intelligence can set a price predicted to maximize profit of the energy (e.g., energy stored in the battery of the vehicle 102).

In various embodiments, the communication component 210 can receive an input from a mobile device 304 associated with the charging station 404 and/or vehicle 102. In this regard, the defined charging criterion herein can comprise reception of the input. For instance, any aspect of the energy management system 104 can be controlled via a registered mobile device 304, mobile device 306, and/or another suitable registered external device.

In various embodiments, the calendar component 212 can determine one or more calendar events applicable to a user entity associated with the vehicle. For instance, the calendar component 212 can be registered with one or more calendars associated with a user of a vehicle 102 and/or charging station 404. In this regard, the defined charging criterion can comprise a charging availability (e.g., current availability and/or future availability) of the vehicle 102 determined based on the one or more calendar events. In various embodiments, the calendar component 212 can synchronize with a user's calendar (e.g., via a mobile device 304, mobile device 306, or via a cloud-based calendar). In an example, if a vehicle 102 is predicted to be inactive for the next sixteen hours (e.g., according to a user's calendar events), the energy component 202 and/or artificial intelligence component 208 can generate a recommendation to sell energy back via the energy management system 104, for instance, during a time when energy prices are relatively high (e.g., based on historical prices and/or according to current market prices). In this regard, a charging station 404 can request that a user sells some energy back (e.g., based on demand). The user can accept or decline (e.g., via the user interface component 206). In some embodiments, the user can offer (e.g., via the user interface component 206) some energy back as a courtesy (e.g., to neighbors in need) and/or set a price at which to sell energy back via the energy management system 104.

In a non-limiting example, twenty (or any suitable quantity) of the vehicles 102 can be electrically coupled to a charging station 404. In this regard, a user (e.g., of a vehicle 102a in FIG. 4) can set a preference of obtaining energy from other vehicles (e.g., vehicle 102b or vehicle 102c) connected to a charging station 404 (e.g., neighbors), rather than from a different energy grid. The charging component 204 can then begin obtaining a charge from those neighbor vehicles (e.g., vehicle 102b or vehicle 102c). Once a first charging resource (e.g., a first layer) is depleted, the charging component 204 can switch to a different energy resource (e.g., a second layer) (e.g., the energy grid) to charge the battery 132 of the vehicle 102.

In various embodiments, the interface component 214 can transmit information (e.g., energy transfer data) between the charging station 404 and the vehicle 102 according to a defined interface protocol. It is noted that, in various embodiments, the information can be transmitted to/from the vehicle 102, charging station 404, mobile device 304 and/or mobile device 306, and/or other suitable entities via a proprietary interface protocol and/or a vehicle-to-everything (V2X) communication protocol. In various embodiments, the defined interface protocol can comprise one or more of a variety of bit lengths, such as four bits, eight bits, sixteen bits, or other suitable bit lengths.

In various embodiments, the machine learning described herein can perform classifications, correlations, inferences and/or expressions associated with principles of artificial intelligence. For instance, machine learning techniques can employ an automatic classification system and/or an automatic classification. In one example, the one or more artificial intelligence techniques can employ a probabilistic and/or statistical-based analysis (e.g., factoring into the analysis utilities and costs) to learn and/or generate inferences. Additionally, the one or more artificial intelligence techniques can employ any suitable machine-learning based techniques, statistical-based techniques and/or probabilistic-based techniques, such as, but not limited to: expert systems, fuzzy logic, SVMs, Hidden Markov Models ("HMMs"), greedy search algorithms, rule-based systems, Bayesian models (e.g., Bayesian networks), neural networks, other non-linear training techniques, data fusion, utility-based analytical systems, systems employing Bayesian models, a combination thereof, and/or the like. In another aspect, the one or more artificial intelligence techniques can perform a set of machine learning computations, such as: a set of clustering machine learning computations; a set of logistic regression machine learning computations; a set of decision tree machine learning computations; a set of random forest machine learning computations; a set of regression tree machine learning computations; a set of least square machine learning computations, a set of instance-based machine learning computations; a set of regression machine learning computations; a set of support vector regression machine learning computations; a set of k-means machine learning computations; a set of spectral clustering machine learning computations; a set of rule learning machine learning computations, a set of Bayesian machine learning computations; a set of deep Boltzmann machine computations; a set of deep belief network computations; a set of different machine learning computations, a combination thereof and/ or the like.

FIG. 3 illustrates a diagram of an example, non-limiting vehicle 102 interior in accordance with one or more embodiments described herein. Repetitive description of like elements employed in other embodiments described herein is omitted for sake of brevity. In various embodiments, the vehicle 102 can comprise an infotainment system 302, which can be utilized by one or more users to interface with the vehicle 102. The infotainment system 302 can comprise a touch screen on which a user can interface with the system 100. For example, the infotainment system 302 can be communicatively coupled with the user interface component 206 in order to enable user interface functionality described herein, such as setting a price at which to acquire or sell energy (e.g., from a vehicle 102 herein), setting green energy preference ratings, and/or other suitable functions in accordance with various embodiments described herein.

FIG. 4 illustrates a diagram of example, non-limiting vehicle scenario(s) in accordance with one or more embodiments described herein. In some scenarios, as illustrated in FIG. 4, vehicle 102a can be parked in parking area 408, adjacent to parking structure 406. The vehicle 102a can be charged via the charging station 404a. Similarly, the vehicle 102b and the vehicle 102c can be charged via the charging station 404b. In various embodiments, the charging station 404 can comprise a level 1, level 2, or level 3 charger, or can comprise another suitable type of charger (e.g., a bidirectional charger) for a vehicle 102. In various embodiments herein, a charging station 404 can comprise a bidirectional charging station 404 (e.g., a bidirectional vehicle charger or bidirectional vehicle charging device). As depicted in FIG. 4, the mobile device 304 can be communicatively coupled to the energy management system 104 (e.g., directly and/or over a cellular network). It is noted that the energy resources 402 can comprise one or more of a variety of grid energy resources 410, such as petroleum, hydrocarbon gas liquids, natural gas, coal, nuclear energy, solar energy, geothermal energy, wind energy, biomass energy, hydropower energy, batteries, other vehicles, or other suitable grid energy resources. The energy resources 402 can additionally, or alternatively, comprise energy stored in batteries of vehicles herein, such as energy stored in the vehicle 102b or the vehicle 102c).

Figure 5:
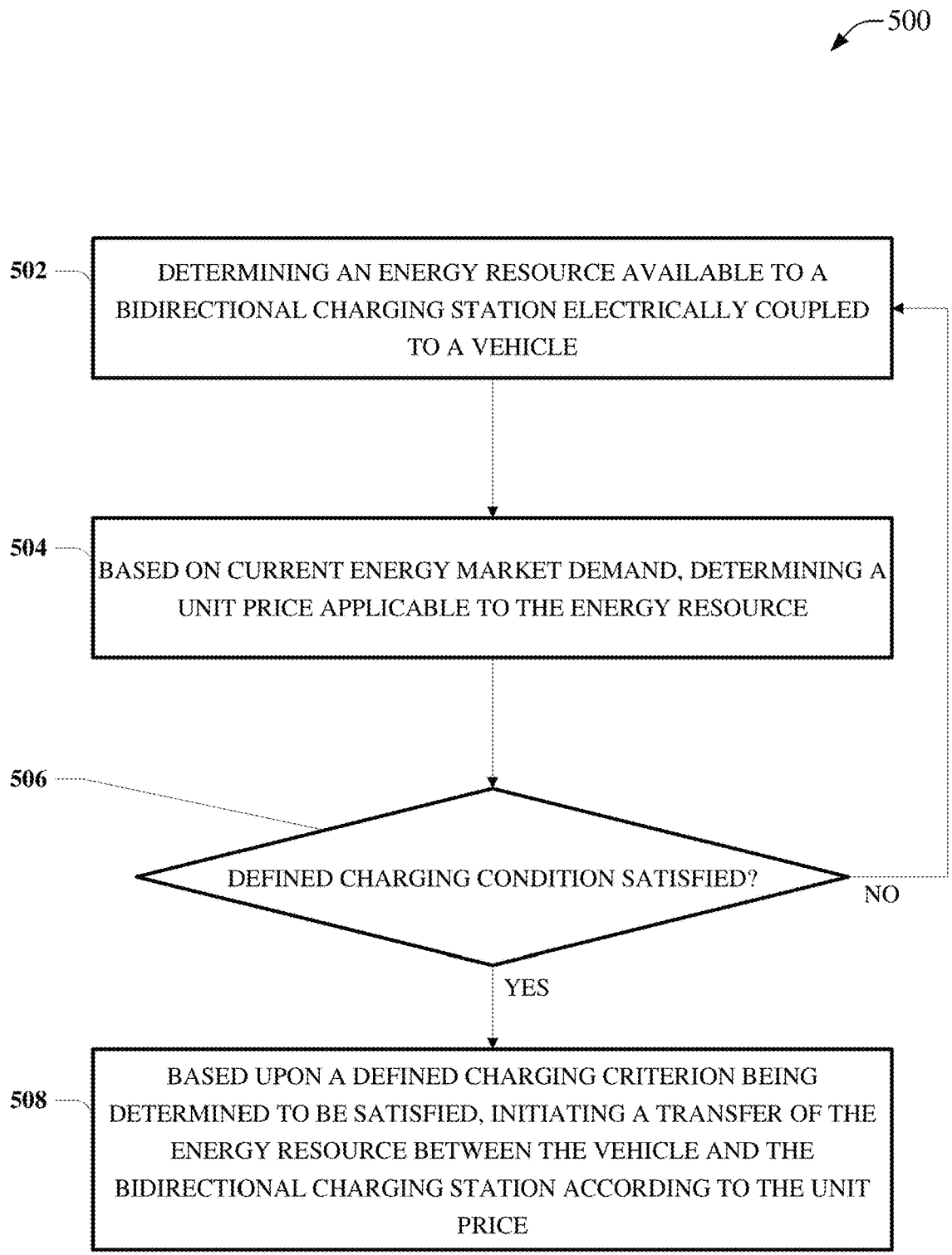
FIG. 5 illustrates a block flow diagram for a process associated with aggregated energy management in accordance with one or more embodiments described herein.

FIG. 5 illustrates a block flow diagram for a process 500 associated with aggregated energy management in accordance with one or more embodiments described herein. At 502, the process 500 can comprise determining (e.g., via an energy component 202) an energy resource (e.g., of energy resources 402) available to a bidirectional charging station (e.g., charging station 404) electrically coupled to a vehicle (e.g., vehicle 102). In this regard, the energy component 202 can determine which energy resource can be utilized for bidirectional energy transfer (e.g., between a vehicle 102 and a charging station 404). In one or more embodiments, the energy resource can be among a plurality of energy resources of a group of energy resources 402. In various embodiments, the energy resource can comprise one or more of a non-renewable energy resource, a renewable energy resource, energy stored in a battery 132 of the vehicle 102, energy stored in a battery of another vehicle, other than the vehicle 102, an aggregation of a plurality of energy resources, and/or another suitable energy resource. At 504, the process 500 can comprise, based on current energy market demand, determining (e.g., via the energy component 202) a unit price applicable to the energy resource. In this regard, the energy component 202 can leverage current energy prices to determine unit pricing for each energy resource available to the vehicle 102 via the energy management system 104. Such energy prices can fluctuate based on time of day, season, or other market conditions. At 506, if a defined charging criterion is determined (e.g., via the charging component 204) to be satisfied (YES at 506), the process 500 can proceed to 508. If at 506, the defined charging criterion is not determined (e.g., via the charging component 204) to be satisfied (NO at 506), the process 500 can return to 502. At 508, the process 500 can comprise, based upon a defined charging criterion being determined to be satisfied, initiating (e.g., via the charging component 204) a transfer of the energy resource between the vehicle (e.g., vehicle 102) and the charging station (e.g., charging station 404) according to the unit price. In some embodiments, the transfer can be from the charging station 404 to the vehicle 102. In further embodiments, the transfer can be from a battery 132 of the vehicle 102 to the energy management system 104 via the charging station 404. In this regard, the charging station 404 and the vehicle 102 can both support bidirectional energy transfer. The charging component 204 can cause the energy resource to be transferred via a wired connection between charging station 404 and the vehicle 102, or via a wireless electrical connection between the charging station 404 and the vehicle 102 (e.g., via electromagnetic induction).

Figure 6:
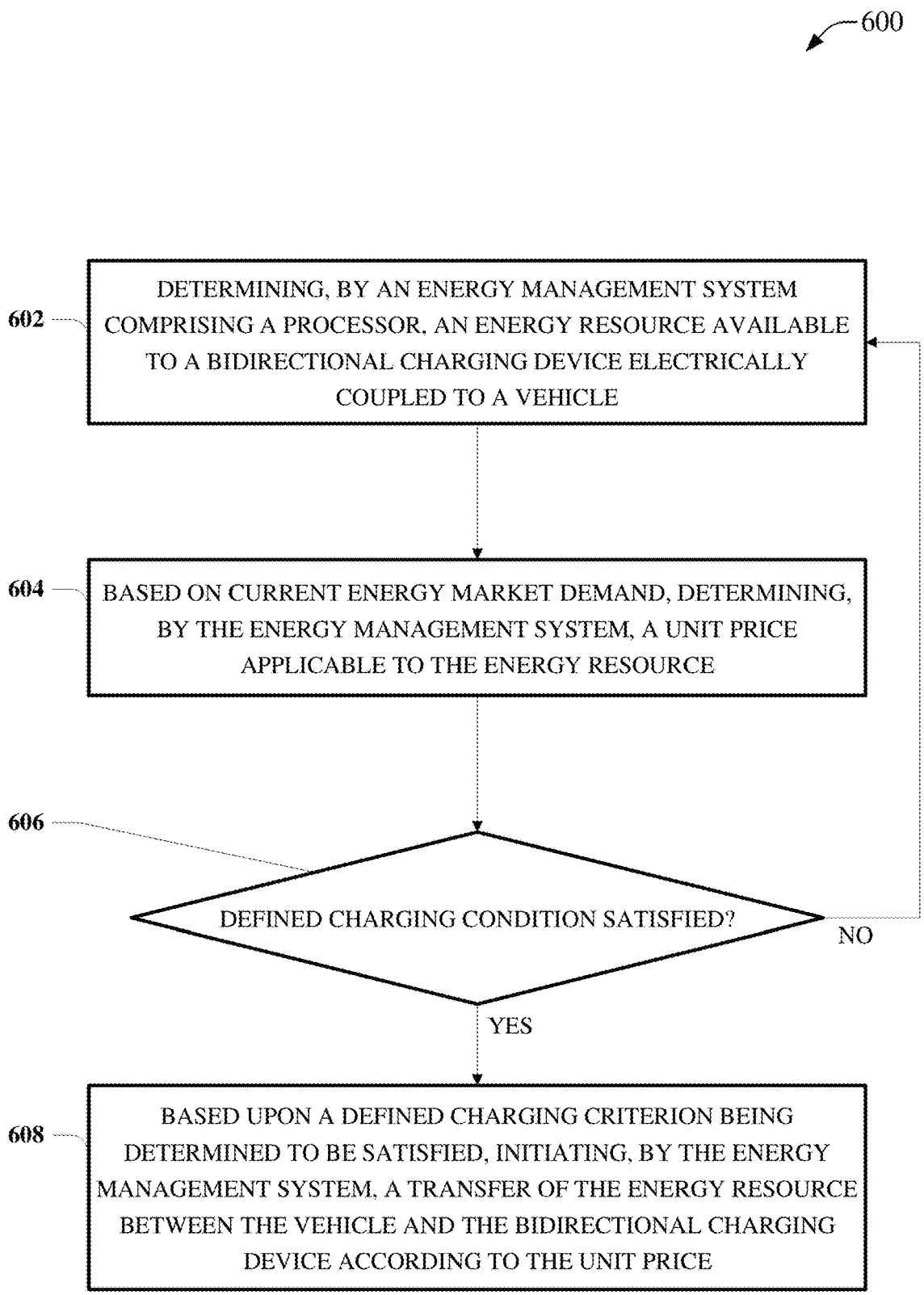
FIG. 6 illustrates a block flow diagram for a process associated with aggregated energy management in accordance with one or more embodiments described herein.

FIG. 6 illustrates a block flow diagram for a process 600 associated with aggregated energy management in accordance with one or more embodiments described herein. At 602, the process 600 can comprise determining, by an energy management system comprising a processor (e.g., via the energy component 202), an energy resource (e.g., of the energy resources 402) available to a bidirectional charging device (e.g., charging station 404) electrically coupled to a vehicle (e.g., vehicle 102). In this regard, the energy component 202 can determine which energy resource can be utilized for bidirectional energy transfer (e.g., between a vehicle 102 and a charging station 404). In one or more embodiments, the energy resource can be among a plurality of energy resources of a group of energy resources 402. In various embodiments, the energy resource can comprise one or more of a non-renewable energy resource, a renewable energy resource, energy stored in a battery 132 of the vehicle 102, energy stored in a battery of another vehicle, other than the vehicle 102, an aggregation of a plurality of energy resources, and/or another suitable energy resource. At 604, the process 600 can comprise, based on current energy market demand, determining, by the energy management system (e.g., via the energy component 202), a unit price applicable to the energy resource. In this regard, the energy component 202 can leverage current energy prices to determine unit pricing for each energy resource available to the vehicle 102 via the energy management system 104. Such energy prices can fluctuate based on time of day, season, or other market conditions. At 606, if a defined charging criterion is determined (e.g., via the charging component 204) to be satisfied (YES at 606), the process 600 can proceed to 608. If at 606, the defined charging criterion is not determined (e.g., via the charging component 204) to be satisfied (NO at 606), the process 600 can return to 602. At 608, the process 600 can comprise, based upon a defined charging criterion being determined to be satisfied, initiating, by the energy management system (e.g., via the charging component 204), a transfer of the energy resource between the vehicle (e.g., vehicle 102) and the bidirectional charging device (e.g., charging station 404) according to the unit price. In some embodiments, the transfer can be from the charging station 404 to the vehicle 102. In further embodiments, the transfer can be from a battery 132 of the vehicle 102 to the energy management system 104 via the charging station 404. In this regard, the charging station 404 and the vehicle 102 can both support bidirectional energy transfer. The charging component 204 can cause the energy resource to be transferred via a wired connection between charging station 404 and the vehicle 102, or via a wireless electrical connection between the charging station 404 and the vehicle 102 (e.g., via electromagnetic induction).

Figure 7:
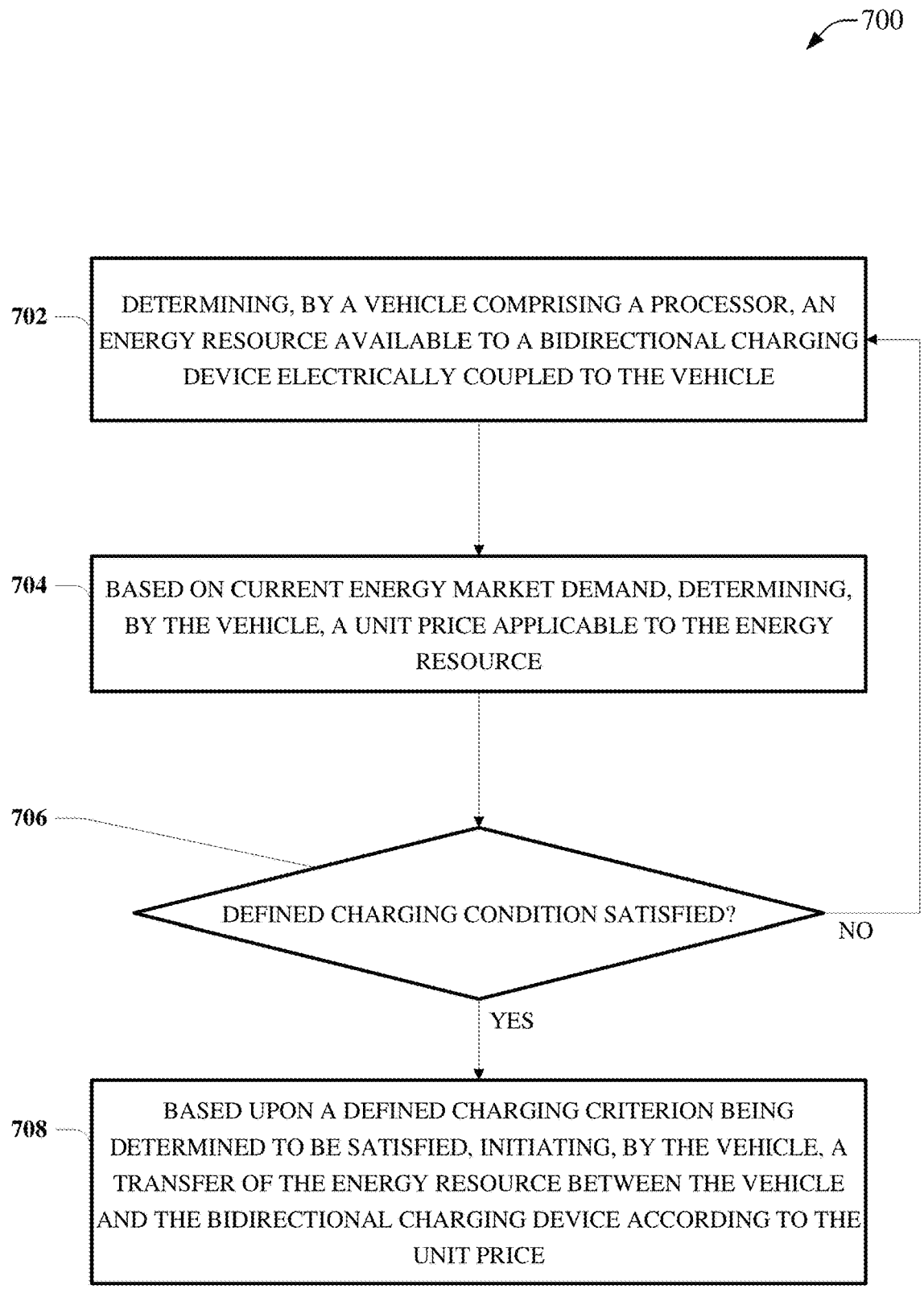
FIG. 7 illustrates a block flow diagram for a process associated with aggregated energy management in accordance with one or more embodiments described herein.

FIG. 7 illustrates a block flow diagram for a process 700 associated with aggregated energy management in accordance with one or more embodiments described herein. At 702, the process 700 can comprise determining, by a vehicle comprising a processor (e.g., via the energy component 202), an energy resource (e.g., of the energy resources 402) available to a bidirectional charging device (e.g., charging station 404) electrically coupled to the vehicle (e.g., vehicle 102). In this regard, the energy component 202 can determine which energy resource can be utilized for bidirectional energy transfer (e.g., between a vehicle 102 and a charging station 404). In one or more embodiments, the energy resource can be among a plurality of energy resources of a group of energy resources 402. In various embodiments, the energy resource can comprise one or more of a non-renewable energy resource, a renewable energy resource, energy stored in a battery 132 of the vehicle 102, energy stored in a battery of another vehicle, other than the vehicle 102, an aggregation of a plurality of energy resources, and/or another suitable energy resource. At 704, the process 700 can comprise, based on current energy market demand, determining, by the vehicle (e.g., via the energy component 202), a unit price applicable to the energy resource. In this regard, the energy component 202 can leverage current energy prices to determine unit pricing for each energy resource available to the vehicle 102 via the energy management system 104. Such energy prices can fluctuate based on time of day, season, or other market conditions. At 706, if a defined charging criterion is determined (e.g., via the charging component 204) to be satisfied (YES at 706), the process 700 can proceed to 708. If at 706, the defined charging criterion is not determined (e.g., via the charging component 204) to be satisfied (NO at 706), the process 700 can return to 702. At 708, the process 700 can comprise, based upon a defined charging criterion being determined to be satisfied, initiating, by the vehicle (e.g., via the charging component 204), a transfer of the energy resource between the vehicle (e.g., vehicle 102) and the bidirectional charging device (e.g., charging station 404) according to the unit price. In some embodiments, the transfer can be from the charging station 404 to the vehicle 102. In further embodiments, the transfer can be from a battery 132 of the vehicle 102 to the energy management system 104 via the charging station 404. In this regard, the charging station 404 and the vehicle 102 can both support bidirectional energy transfer. The charging component 204 can cause the energy resource to be transferred via a wired connection between charging station 404 and the vehicle 102, or via a wireless electrical connection between the charging station 404 and the vehicle 102 (e.g., via electromagnetic induction).

Systems described herein can be coupled (e.g., communicatively, electrically, operatively, optically, inductively, acoustically, etc.) to one or more local or remote (e.g., external) systems, sources, and/or devices (e.g., electronic control systems (ECU), classical and/or quantum computing devices, communication devices, etc.). For example, system 100 (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, inductively, acoustically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, system 100 can communicate with one or more local or remote (e.g., external) systems, sources, and/or devices, for instance, computing devices using such a network, which can comprise virtually any desired wired or wireless technology, including but not limited to: powerline ethernet, VHF, UHF, AM, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, L-band voice or data information, 6LoWPAN (IPv6 over Low power Wireless Area Networks), Z-Wave, an ANT, an ultra-wideband (UWB) standard protocol, and/or other proprietary and non-proprietary communication protocols. In this example, system 100 can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

System herein can comprise one or more computer and/or machine readable, writable, and/or executable components and/or instructions that, when executed by processor (e.g., a processing unit 116 which can comprise a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). Consequently, according to numerous embodiments, system herein and/or any components associated therewith as disclosed herein, can employ a processor (e.g., processing unit 116) to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system (e.g., a system 100 or any other system or device described herein) can comprise a computing device, a general-purpose computer, field-programmable gate array, AI accelerator application-specific integrated circuit, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, wearable device, internet of things device, a cell phone, a smart phone, a consumer appliance and/or instrumentation, an industrial and/or commercial device, a digital assistant, a multimedia Internet enabled phone, a multimedia players, and/or another type of device.

Figure 8:
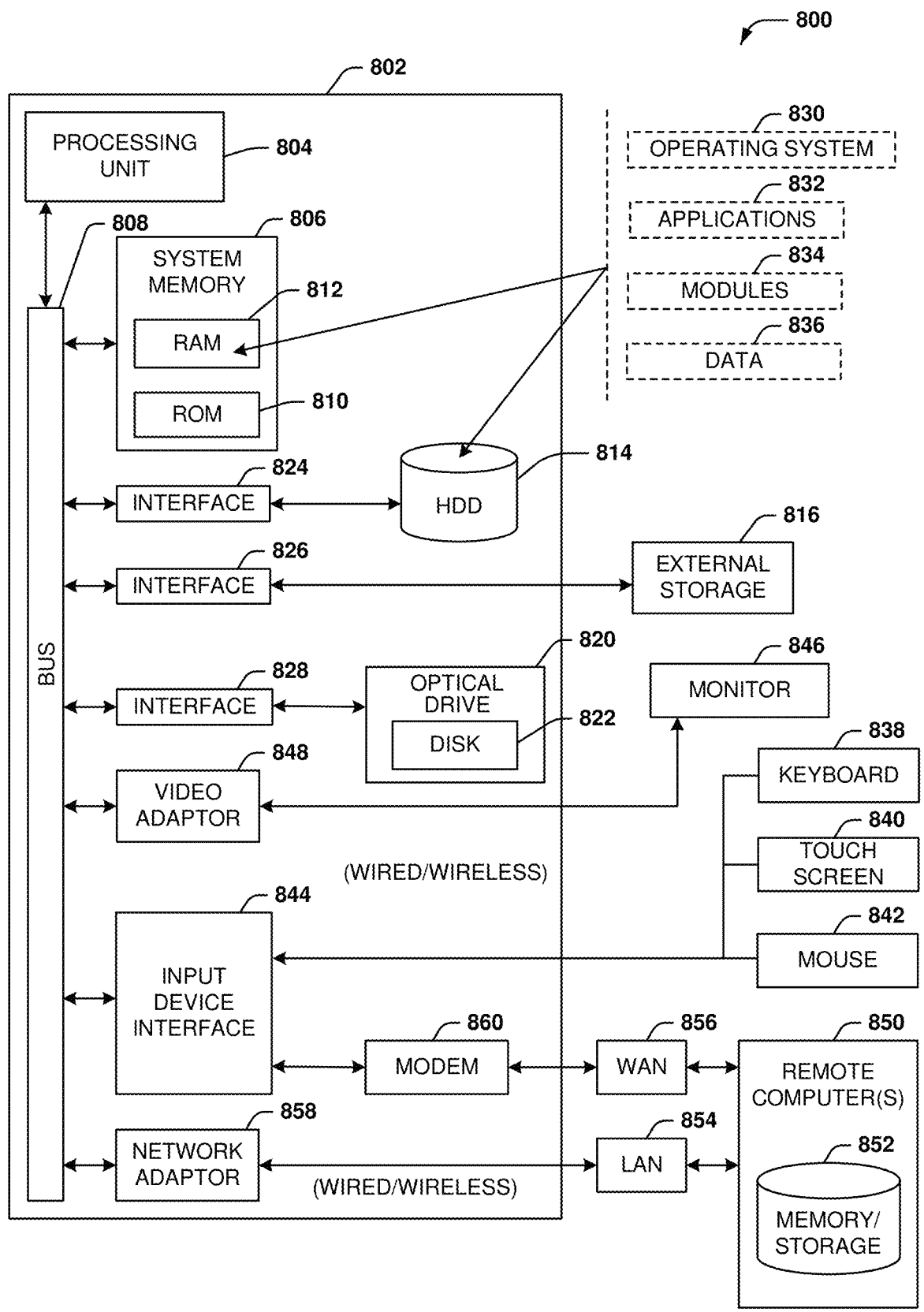
FIG. 8 is an example, non-limiting computing environment in which one or more embodiments described herein can be implemented.

In order to provide additional context for various embodiments described herein, FIG. 8 and the following discussion are intended to provide a brief, general description of a suitable computing environment 800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers (e.g., ruggedized personal computers), field-programmable gate arrays, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, optic, infrared, and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors, field-programmable gate array, AI accelerator application-specific integrated circuit, or other suitable processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a nonvolatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data. It is noted that unified Extensible Firmware Interface(s) can be utilized herein.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a disk 822 such as a CD-ROM disk, a DVD, a BD, etc.). While the internal HDD 814 is illustrated as located within the computer 802, the internal HDD 814 can also be configured for external use in a suitable chassis (not shown). Additionally, while not shown in environment 800, a solid-state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enabled with a security module, such as a trusted processing module (TPM). For instance, with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
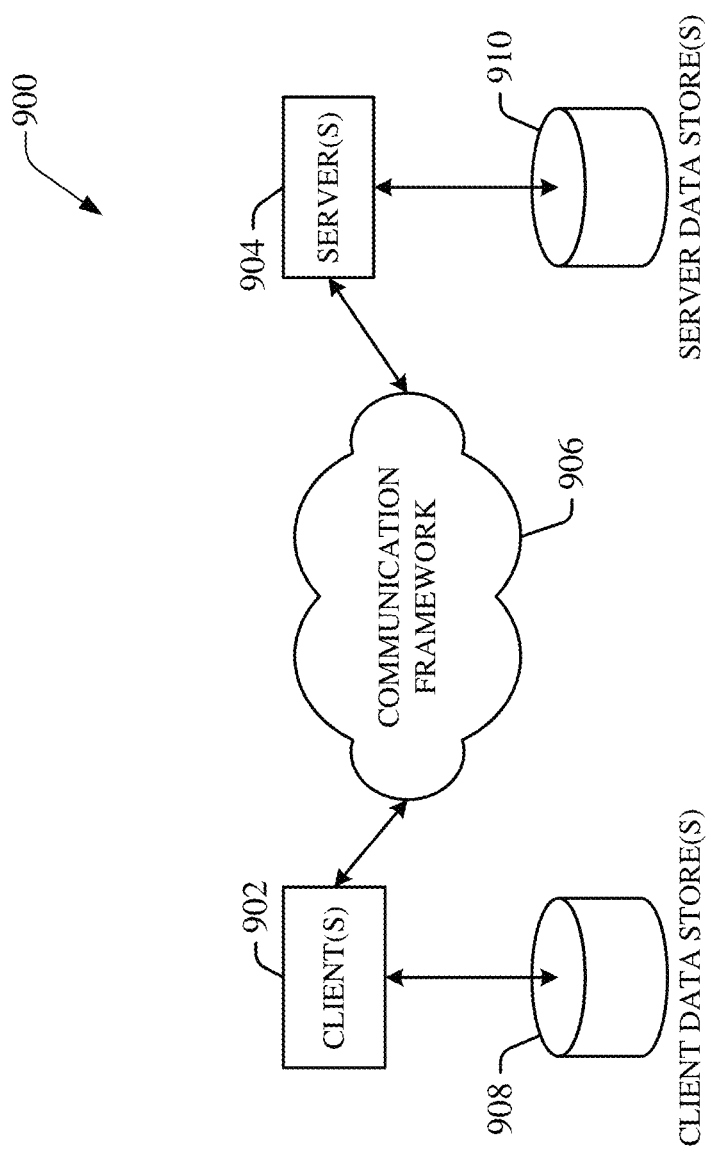
FIG. 9 is an example, non-limiting networking environment in which one or more embodiments described herein can be implemented.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform transformations of media items by employing aspects of this disclosure, for example. One possible communication between a client 902 and a server 904 can be in the form of a data packet adapted to be transmitted between two or more computer processes wherein data packets may include coded analyzed headspaces and/or input. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904. Further, the client(s) 902 can be operatively connected to one or more server data store(s) 910.

In one exemplary implementation, a client 902 can transfer an encoded file, (e.g., encoded media item), to server 904. Server 904 can store the file, decode the file, or transmit the file to another client 902. It is noted that a client 902 can also transfer uncompressed file to a server 904 and server 904 can compress the file and/or transform the file in accordance with this disclosure. Likewise, server 904 can encode information and transmit the information via communication framework 906 to one or more clients 902.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A system, comprising:
    a memory that stores computer executable components; and
    a processor that executes the computer executable components stored in the memory, wherein the computer executable components comprise:
    an energy component that determines an energy resource available to a bidirectional charging station electrically coupled to a vehicle, and based on current energy market demand, a unit price applicable to the energy resource; and
    a charging component that, based upon a defined charging criterion being determined to be satisfied, initiates a transfer of the energy resource between the vehicle and the bidirectional charging station according to the unit price.

2. The system of any preceding clause, wherein the energy resource is among a plurality of energy resources of a group of energy resources.

3. The system of any preceding clause, wherein the computer executable components further comprise:
    a user interface component that receives an input from a user entity associated with the bidirectional charging station, wherein the defined charging criterion comprises reception of the input.

4. The system of any preceding clause, wherein the defined charging criterion comprises a defined energy price preference threshold, wherein the unit price is determined to be less than or equal to the defined energy price preference threshold.

5. The system of any preceding clause, wherein the energy component further determines a green energy rating, applicable to the energy resource, according to a defined green energy rating process, wherein the defined charging criterion comprises a defined green energy preference rating, and wherein the green energy rating is determined to be greater than or equal to the defined green energy preference rating.

6. The system of any preceding clause, wherein the computer executable components further comprise:
    an artificial intelligence component that, using machine learning applied to past energy resources, past unit prices, or past green energy ratings, determines the defined charging criterion.

7. The system of any preceding clause, wherein the computer executable components further comprise:
    a communication component that receives an input from a mobile device associated with the bidirectional charging station, wherein the defined charging criterion comprises reception of the input.

8. The system of any preceding clause, wherein the energy resource comprises a non-renewable energy resource.

9. The system of any preceding clause, wherein the energy resource comprises a renewable energy resource.

10. The system of any preceding clause, wherein the energy resource comprises energy stored in a battery of the vehicle.

11. The system of any preceding clause, wherein the energy resource comprises energy stored in a battery of another vehicle, other than the vehicle.

12. The system of any preceding clause, wherein the computer executable components further comprise:
a calendar component that determines one or more calendar events applicable to a user entity associated with the vehicle, wherein the defined charging criterion comprises a charging availability of the vehicle determined based on the one or more calendar events.

13. The system of any preceding clause, wherein the energy resource comprises an aggregation of a plurality of energy resources.

14. The system of any preceding clause, wherein the computer executable components further comprise:
an interface component that transmits energy transfer data between the bidirectional charging station and the vehicle, according to a defined interface protocol.

15. The system of clause 1 above with any set of combinations of the systems 2-14 above.

16. A non-transitory machine-readable medium, comprising executable instructions that, when executed by a processor, facilitate performance of operations, comprising:
determining an energy resource available to a bidirectional vehicle charger electrically coupled to a vehicle, wherein the bidirectional vehicle charger comprises the non-transitory machine-readable medium and the processor;
based on current energy market demand, determining a unit price applicable to the energy resource; and
based upon a defined charging criterion being determined to be satisfied, initiating a transfer of the energy resource between the vehicle and the bidirectional vehicle charger according to the unit price.

17. The non-transitory machine-readable medium of any preceding clause, wherein the operations further comprise:
receiving an input from a user entity associated with the bidirectional vehicle charger, wherein the defined charging criterion comprises reception of the input.

18. The non-transitory machine-readable medium of any preceding clause, wherein the operations further comprise:
using machine learning applied to past energy resources, past unit prices, or past green energy ratings, determining the defined charging criterion.

19. The non-transitory machine-readable medium of clause 16 above with any set of combinations of the non-transitory machine-readable mediums 17-18 above.

20. A method, comprising:
determining, by an energy management system comprising a processor, an energy resource available to a bidirectional charging device electrically coupled to a vehicle;
based on current energy market demand, determining, by the energy management system, a unit price applicable to the energy resource; and
based upon a defined charging criterion being determined to be satisfied, initiating, by the energy management system, a transfer of the energy resource between the vehicle and the bidirectional charging device according to the unit price.

21. The method of any preceding clause, further comprising:
determining, by the energy management system, one or more calendar events applicable to a user entity associated with the vehicle, wherein the defined charging criterion comprises a charging availability of the vehicle determined based on the one or more calendar events.

22. The method of any preceding clause, further comprising:
transmitting, by the energy management system, energy transfer data between the bidirectional charging device and the vehicle, according to a defined interface protocol.

23. The method of clause 20 above with any set of combinations of the methods of clauses 21-22 above.

24. A vehicle, comprising:
a memory that stores computer executable components; and
a processor that executes the computer executable components stored in the memory, wherein the computer executable components comprise:
an energy component that determines an energy resource available to a bidirectional charging station electrically coupled to the vehicle, and based on current energy market demand, a unit price applicable to the energy resource; and
a charging component that, based upon a defined charging criterion being determined to be satisfied, initiates a transfer of the energy resource between the vehicle and the bidirectional charging station according to the unit price.

25. The vehicle of any preceding clause, wherein the energy resource is among a plurality of energy resources of a group of energy resources.

26. The vehicle of any preceding clause, wherein the computer executable components further comprise:
a user interface component that receives an input from a user entity associated with the vehicle, wherein the defined charging criterion comprises reception of the input.

27. The vehicle of any preceding clause, wherein the defined charging criterion comprises a defined energy price preference threshold, wherein the unit price is determined to be less than or equal to the defined energy price preference threshold.

28. The vehicle of any preceding clause, wherein the energy component further determines a green energy rating, applicable to the energy resource, according to a defined green energy rating process, wherein the defined charging criterion comprises a defined green energy preference rating, and wherein the green energy rating is determined to be greater than or equal to the defined green energy preference rating.

29. The vehicle of any preceding clause, wherein the computer executable components further comprise:
an artificial intelligence component that, using machine learning applied to past energy resources, past unit prices, or past green energy ratings, determines the defined charging criterion.

30. The vehicle of any preceding clause, wherein the computer executable components further comprise:
a communication component that receives an input from a mobile device associated with the vehicle, wherein the defined charging criterion comprises reception of the input.

31. The vehicle of any preceding clause, wherein the energy resource comprises a non-renewable energy resource.

32. The vehicle of any preceding clause, wherein the energy resource comprises a renewable energy resource.

33. The vehicle of any preceding clause, wherein the energy resource comprises energy stored in a battery of the vehicle.

34. The vehicle of any preceding clause, wherein the energy resource comprises energy stored in a battery of another vehicle, other than the vehicle.

35. The vehicle of any preceding clause, wherein the computer executable components further comprise:
a calendar component that determines one or more calendar events applicable to a user entity associated with the vehicle, wherein the defined charging criterion comprises a charging availability of the vehicle determined based on the one or more calendar events.

36. The vehicle of any preceding clause, wherein the energy resource comprises an aggregation of a plurality of energy resources.

37. The vehicle of any preceding clause, wherein the computer executable components further comprise:
an interface component that transmits energy transfer data between the charging station and the vehicle, according to a defined interface protocol.

38. The vehicle of clause 24 above with any set of combinations of the vehicles 25-37 above.

39. A non-transitory machine-readable medium, comprising executable instructions that, when executed by a processor, facilitate performance of operations, comprising:
determining an energy resource available to a bidirectional vehicle charger electrically coupled to a vehicle, wherein the vehicle comprises the non-transitory machine-readable medium and the processor;
based on current energy market demand, determining a unit price applicable to the energy resource; and
based upon a defined charging criterion being determined to be satisfied, initiating a transfer of the energy resource between the vehicle and the bidirectional vehicle charger according to the unit price.

40. The non-transitory machine-readable medium of any preceding clause, wherein the operations further comprise:
receiving an input from a user entity associated with the vehicle, wherein the defined charging criterion comprises reception of the input.

41. The non-transitory machine-readable medium of any preceding clause, wherein the operations further comprise:
using machine learning applied to past energy resources, past unit prices, or past green energy ratings, determining the defined charging criterion.

42. The non-transitory machine-readable medium of clause 39 above with any set of combinations of the non-transitory machine-readable mediums 40-41 above.

43. A method, comprising:
determining, by a vehicle comprising a processor, an energy resource available to a bidirectional charging device electrically coupled to the vehicle;
based on current energy market demand, determining, by the vehicle, a unit price applicable to the energy resource; and
based upon a defined charging criterion being determined to be satisfied, initiating, by the vehicle, a transfer of the energy resource between the vehicle and the bidirectional charging device according to the unit price.

44. The method of any preceding clause, further comprising:
determining, by the vehicle, one or more calendar events applicable to a user entity associated with the vehicle, wherein the defined charging criterion comprises a charging availability of the vehicle determined based on the one or more calendar events.

45. The method of any preceding clause, further comprising:
transmitting, by the vehicle, energy transfer data between the charging station and the vehicle, according to a defined interface protocol.

46. The method of clause 43 above with any set of combinations of the methods of clauses 44-45 above.

What is claimed is:

1. A system, comprising:
a memory that stores computer executable components; and
a processor that executes at least one of the computer executable components that:
identifies a group of energy resources comprising renewable energy resources, non-renewable energy resources, and electric vehicles plugged into bidirectional charging stations of a vehicle charging network;
determines, according to a defined green energy rating process, a respective green energy rating for each energy resource of the group of the energy resources, wherein the respective green energy ratings for the electric vehicles is based on the respective percentage of current battery charge of the electric vehicles is from renewable energy resources;
selects, based upon a defined charging criterion, an energy resource of the group of the energy resources available to a bidirectional charging station electrically coupled to an electric vehicle, wherein the defined charging criterion is based on current energy market demand, a unit price applicable to the energy resource, and the green energy rating of the energy resource; and
remotely controls the bidirectional charging station to transfer energy from the energy resource to the electric vehicle according to the defined charging criterion, wherein in response to the selected energy resource being another electric vehicle and the defined charging criterion specifying a defined percentage of the energy that must be from renewable energy resources, remotely controlling the transfer of the energy comprises limiting an amount of energy transferred from the other electric vehicle based on the defined percentage of the energy specified in the defined charging criterion and the respective percentage of current battery charge of the other electric vehicle that is from renewable energy resources.

2. The system of claim 1, wherein the at least one of the computer executable components further:
tracks types of energy resources employed to charge batteries of the electric vehicles.

3. The system of claim 1, wherein the at least one of the computer executable components further:
receives an input from a user entity associated with the bidirectional charging station, wherein the input specifies the defined percentage of the energy that must be from renewable energy resources.

4. The system of claim 1, wherein the defined charging criterion comprises a defined energy price preference threshold.

5. The system of claim 1, wherein the defined charging criterion comprises a defined green energy preference rating.

6. The system of claim 1, wherein the selecting employs a machine learning that minimizes a carbon footprint of the vehicle charging network.

7. The system of claim 1, wherein the selecting employs a machine learning that determines a respective charging availability of one or more of the electric vehicles plugged into the bidirectional charging stations based on one or more calendar events associated with one or more users associated with the one or more of the electric vehicles.

8. A non-transitory machine-readable medium, comprising executable instructions that, when executed by a processor, facilitate performance of operations, comprising:
identifying a group of energy resources comprising renewable energy resources, non-renewable energy resources, and electric vehicles plugged into bidirectional charging stations of a vehicle charging network;
determining, according to a defined green energy rating process, a respective green energy rating for each energy resource of the group of the energy resources, wherein the respective green energy ratings for the electric vehicles is based on the respective percentage of current battery charge of the electric vehicles is from renewable energy resources;
selecting, based upon a defined charging criterion, an energy resource of the group of the energy resources available to a bidirectional charging station electrically coupled to an electric vehicle, wherein the defined charging criterion is based on current energy market demand, a unit price applicable to the energy resource, and the green energy rating of the energy resource; and
remotely controls the bidirectional charging station to transfer energy from the energy resource to the electric vehicle according to the defined charging criterion, wherein in response to the selected energy resource being another electric vehicle and the defined charging criterion specifying a defined percentage of the energy that must be from renewable energy resources, remotely controlling the transfer of the energy comprises limiting an amount of energy transferred from the other electric vehicle based on the defined percentage of the energy specified in the defined charging criterion and the respective percentage of current battery charge of the other electric vehicle that is from renewable energy resources.

9. The non-transitory machine-readable medium of claim 8, wherein the operations further comprise:
tracking types of energy resources employed to charge batteries of the electric vehicles.

10. The non-transitory machine-readable medium of claim 8, wherein the operations further comprise:
receiving an input from a user entity associated with the bidirectional charging station, wherein the input specifies the defined percentage of the energy that must be from renewable energy resources.

11. The non-transitory machine-readable medium of claim 8, wherein the defined charging criterion comprises a defined energy price preference threshold.

12. The non-transitory machine-readable medium of claim 8, wherein the defined charging criterion comprises a defined green energy preference rating.

13. The non-transitory machine-readable medium of claim 8, wherein the selecting employs a machine learning that minimizes a carbon footprint of the vehicle charging network.

14. A method, comprising:
identifying, by a system comprising a processor, a group of energy resources comprising renewable energy resources, non-renewable energy resources, and electric vehicles plugged into bidirectional charging stations of a vehicle charging network;
determining, by the system, according to a defined green energy rating process, a respective green energy rating for each energy resource of the group of the energy resources, wherein the respective green energy ratings for the electric vehicles is based on the respective percentage of current battery charge of the electric vehicles is from renewable energy resources;
selecting, by the system, based upon a defined charging criterion, an energy resource of the group of the energy resources available to a bidirectional charging station electrically coupled to an electric vehicle, wherein the defined charging criterion is based on current energy market demand, a unit price applicable to the energy resource, and the green energy rating of the energy resource; and
remotely controlling, by the system, the bidirectional charging station to transfer energy from the energy resource to the electric vehicle according to the defined charging criterion, wherein in response to the selected energy resource being another electric vehicle and the defined charging criterion specifying a defined percentage of the energy that must be from renewable energy resources, remotely controlling the transfer of the energy comprises limiting an amount of energy transferred from the other electric vehicle based on the defined percentage of the energy specified in the defined charging criterion and the respective percentage of current battery charge of the other electric vehicle that is from renewable energy resources.

15. The method of claim 14, wherein the selecting employs a machine learning that determines a respective charging availability of one or more of the electric vehicles plugged into the bidirectional charging stations based on one or more calendar events associated with one or more users associated with the one or more of the electric vehicles.

16. The method of claim 14, further comprising:
tracking, by the system, types of energy resources employed to charge batteries the electric vehicles.

17. The method of claim 14, further comprising:
receiving, by the system, an input from a user entity associated with the bidirectional charging station, wherein the input specifies the defined percentage of the energy that must be from renewable energy resources.

18. The method of claim 14, wherein the defined charging criterion comprises a defined energy price preference threshold.

19. The method of claim 14, wherein the defined charging criterion comprises a defined green energy preference rating.

20. The method of claim 14, wherein the selecting employs a machine learning that minimizes a carbon footprint of the vehicle charging network.

* * * * *